3,147,274
ANISIC ACID DERIVATIVES OF BENZIMIDAZOLES

Clarence L. Moyle, Clare, and Diomed M. Chern, Midland, Mich., assignors to The Dow Chemical Company, Midland, Mich., a corporation of Delaware
No Drawing. Filed May 24, 1962, Ser. No. 197,240
8 Claims. (Cl. 260—309.2)

This invention is directed to substituted anisic acid compounds, particularly (a) compounds having the formula

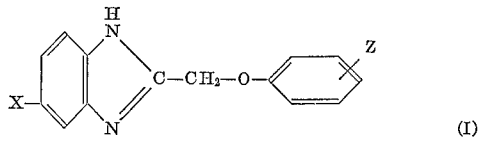

(I)

and (b) mineral acid salts of these compounds. In this and succeeding formulas, X may be —H, —Cl, —Br or —R; Z may be —COOH, —COOM, —COONH$_4$, —COOB, —COOR, or —CONH$_2$; and wherein R is lower alkyl containing from 1 to 4 carbon atoms, inclusive, M is alkali metal and —COOB represents an amine salt group where the salt forming base is selected from lower alkylamines and lower alkanolamines.

The expression "lower" as above employed indicates a carbon content of from 1 to 4, inclusive. By "alkali metal" is meant sodium, potassium and lithium. By "lower alkylamines" and "lower alkanolamines" are meant amine bases which have one or more lower alkyl or lower hydroxyalkyl radicals on the basic nitrogen and in which lower designates from 1 to 4 carbon atoms. Typical amine bases, A, which form with —COOH, the amine salt group, —COOB which may also be designated —COOH·A, include methylamine, ethylamine, ethanolamine, isopropanolamine, methylaminoethanol, ethylaminoethanol, diethanolamine, isopropylamine, n-propylamine, n-butylamine, trimethylamine, diisopropylamine, N-methyl-isopropylamine, N-methyl-sec.-butylamine, 2-aminopropyl alcohol, isopropylaminoethanol, n-butylaminoethanol, bis(2-hydroxypropyl)amine, triethylamine, tri(n-butyl)amine, triisopropanolamine, triethanolamine, dimethylaminoethanol, diethylaminoethanol, dibutylaminoethanol, ethyldiethanolamine, dimethylamine, diethylamine and triisopropylamine.

The products of the present invention are white or light colored solids and are generally soluble in polar solvents such as acetone, lower alcohols and dimethylformamide. The products which are alkali metal or alkanolamine salts are soluble in water. All products are of very low solubility in hydrocarbon solvents.

The anisic acid compounds of the present invention have several applications. The products of the present invention are useful as fungicidal agents and are adapted to be incorporated into compositions and materials for mildew protection, such as for example, exterior paint. The compounds are useful as laboratory tools, particularly for restoring animals for further testing when, in connection with pharmacological studies of drug action, animals suffer a severe drop in blood pressure.

The products of the present invention which are free acids having the formula

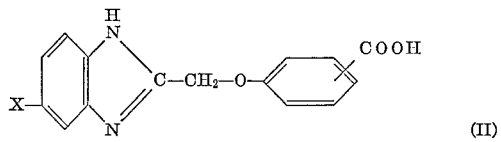

(II)

may be prepared by reacting an appropriately substituted o-phenylenediamine having the formula

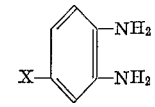

with an appropriate phenoxyalkanoic acid having the formula

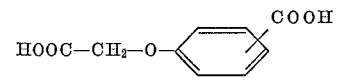

in the presence of a mineral acid catalyst to produce the desired anisic acid product which forms a mineral acid salt with a strong mineral acid because of the basic nitrogen in the benzimidazole part of the structure. The mineral acid salt may be reacted with substantially equimolar proportions of a base such as ammonia to produce the anisic acid compound represented by Formula II.

In carrying out the reaction, the appropriate o-phenylenediamine, phenoxyalkanoic acid and mineral acid catalyst are mixed together for a time sufficient to complete the reaction. The exact amounts of the reactants are not critical. Good results are obtained by employing substantially equimolar proportions of o-phenylenediamine and phenoxyalkanoic acid. A reaction takes place at a temperature in the range of from about 80° to about 130° C. Preferably, the reaction is carried out in a solvent; thus, the reflux temperature of the resulting solution provides a convenient reaction temperature. The most suitable solvents are water or mixtures thereof with lower alcohols. Many of the o-phenylenediamines are available commercially and frequently are in the form of hydrochlorides or other mineral acid salts; such salts are, of course, suitable in the reaction. The reaction must be carried out in a medium which is definitely acidic. Any acid may be employed to render the medium acidic; aqueous mineral acids are preferred. In the event it is desired to prepare the mineral acid salt of the anisic acid compound, the appropriate mineral acid is used to carry out the reaction. Thus, the acid may be hydrochloric, hydrobromic, phosphoric or sulfuric. If the free anisic acid compound is desired, hydrochloric acid is convenient. The reaction is complete in from about 15 to 72 hours. As the result of these operations, the mineral acid salt of the anisic acid compound is formed and may be recovered from a diluted aqueous reaction mixture. The salt may be purified, if desired, by conventional procedures. The free anisic acid compound may be obtained from the mineral acid salt by reacting the salt with a substantially equimolar proportion of a base. Suitable bases include ammonium hydroxide and sodium bicarbonate. The reaction is carried out by mixing the salt with an aqueous solution of the base, usually by warming. The mixture is allowed to cool and then carefully acidified to pH 5.5–5.8 with hydrochloric acid to obtain the desired anisic acid compound which precipitates in the reaction mixture. Wide variance of pH is not permissible inasmuch as excess acid will result in salt formation at the benzimidazole nitrogen. The acid is recovered by filtration and may be purified, if desired, according to conventional procedures such as by treating with activated charcoal and/or by recrystallization from hot aqueous lower alcohol solution.

In a preferred method for carrying out this reaction, substantially equimolar proportions of the appropriate o-phenylenediamine and the appropriate phenoxyalkanoic acid are mixed together in aqueous hydrochloric acid and heated at reflux temperature for from about 15 to 72 hours. At the end of this period, the mixture is allowed to cool to room temperature to obtain an anisic acid hydrochloride products as a precipitate. The latter is recovered by filtration and washed. The hydrochloride may be converted to the free acid by warming substantially equimolar proportions of the hydrochloride and aqueous ammonia for several hours, carefully acidifying to pH 5.5–5.8 with aqueous hydrochloric acid to obtain the desired anisic acid product as a precipitate. The product is recovered by filtration and purified by recrystallization.

The anisic acid products of the present invention which are salts, i.e., compounds wherein Z in Formula I is —COOM, —COONH$_4$ or —COOB may be prepared by mixing and warming together, usually in aqueous medium, the appropriate anisic acid prepared as above described and the appropriate base and thereafter vaporizing off the water to recover the desired salt. Substantially equimolar proportions of the reactants are employed and the reaction may be carried out at room temperature or on a steam bath. If desired, the salt may be purified by conventional procedures.

The anisic acid compounds which are esters, i.e., compounds wherein Z in Formula I is —COOR, may be prepared by reacting the acid chloride derived from the appropriate anisic acid (II) with the appropriate alcohol, ROH, or its sodium salt, RONa. The exact amounts of the reactants are not critical, some products being obtained in any case; usually, it is convenient to employ free alcohol and in excess, the excess alcohol functioning as a solvent or reaction medium. The reaction may be carried out at from room temperature to the boiling point of the alcohol or auxiliary inert solvent, if present, and for a period of from several minutes to several hours. Conveniently, the acid chloride is prepared as the first step in the reaction by reacting thionyl chloride with the free acid (II) in an inert solvent and thereafter reacting the acid chloride containing reaction medium with excess of the appropriate alcohol, ROH.

In a preferred method for carrying out the reaction, thionyl chloride is added dropwise to a solution of the appropriate anisic acid (II) in an inert solvent. Suitable solvents include dimethylformamide and chloroform. The reaction mixture is allowed to stand for several hours at ambient temperature to obtain the intermediate acid chloride. At the end of this period, an excess of the appropriate alcohol is added and the resulting mixture maintained in the temperature range of from about 15° C. to about 100° C. whereupon a reaction takes place to obtain the desired ester product. The product may be recovered from the reaction mixture by washing the reaction mixture with water, extracting the product with ether or other inert, water-immiscible solvent and thereafter vaporizing off the solvent.

The anisic acid compounds which are amides, i.e., wherein Z in Formula I is —CONH$_2$, may be prepared by reacting the acid chloride derived from the appropriate acid (II) with ammonia. Although the exact amounts of the reactants are not critical, ammonia is employed in excess and conveniently in the form of concentrated ammonium hydroxide. The reaction is exothermic, and is carried out initially with cooling, conveniently at ice bath temperatures and may be warmed to complete the reaction to obtain the desired amide compound. Conveniently, as in the preparation of esters, the acid chloride is prepared as the first step in the reaction by reacting thionyl chloride with the free acid in an inert solvent and thereafter reacting the acid chloride containing reaction medium with ammonia.

In a preferred method for carrying out the reaction, thionyl chloride is added dropwise to a solution of the appropriate anisic acid (II) in an inert solvent as above described, and allowed to stand for several hours to produce the acid chloride. At the end of this period, the reaction mixture is cooled, conveniently in an ice bath and added slowly and with stirring and cooling to concentrated ammonium hydroxide. After completion of the addition the reaction mixture is warmed on the steam bath to complete the formation of the amide and to drive off unreacted ammonia. The product is recovered from the reaction mixture by diluting with water and cooling to precipitate the desired product. The latter may be purified, if desired, by conventional procedures.

The following examples illustrate the invention but are not to be construed as limiting:

EXAMPLE 1

α-(2-Benzimidazolyl)-o-Anisic Acid and Its Hydrochloride

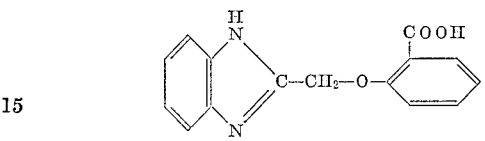

15.7 grams (0.08 mole) of o-carboxyphenoxyacetic acid, 7.6 grams (0.07 mole) of o-phenylenediamine, 60 milliliters of water and 30 milliliters of 37 percent hydrochloric acid were mixed together and heated at reflux temperature for 60 hours to obtain an α-(2-benzimidazolyl)-o-anisic acid product which in the presence of excess hydrochloric acid forms the acid salt. The reaction mixture was then diluted with 500 milliliters of water to precipitate the α-(2-benzimidazolyl)-o-anisic acid hydrochloride salt which was then recovered by filtration and washed with water. The molecular weight of the α-(2-benzimidazolyl)-o-anisic acid hydrochloride product is 299.

The hydrochloride product thus obtained was then suspended in dilute aqueous ammonium hydroxide solution dissolved by warming and acidified to pH of 5.5–5.8 with hydrochloric acid to obtain the desired α-(2-benzimidazolyl)-o-anisic acid product as a white crystalline solid. The latter after recrystallization from 50 percent aqueous ethanol had a melting point of 212°–213° C.

EXAMPLE 2

α-(2-Benzimidazolyl)-p-Anisic Acid and Its Hydrochloride 15.7 grams (0.08 mole) of p-carboxyphenoxyacetic acid, 7.6 grams (0.07 mole) of o-phenylenediamine, 60 milliliters of water and 30 milliliters of 37 percent hydrochloric acid were mixed together and heated at reflux temperature for 69 hours to obtain α-(2-benzimidazolyl)-p-anisic acid as its hydrochloride. In a manner similar to that described in Example 1, the reaction mixture was diluted with water to precipitate α-(2-benzimidazolyl)-p-anisic acid hydrochloride salt which was recovered by filtration and washed. The molecular weight of the hydrochloride product thus obtained is 299.

The hydrochloride product was then dissolved in dilute aqueous ammonium hydroxide solution and thereafter, dilute hydrochloric acid added thereto until the pH became 5.5–5.8 to obtain a crude α-(2-benzimidazolyl)-p-anisic acid product. The latter was dissolved in acetone-dimethylformamide and the solution treated with activated charcoal; water was thereafter added to the acetone-dimethylformamide solution to obtain a purified product which melted at 286°–287° C. with decomposition.

EXAMPLE 3

α-(5-Methyl-2-Benzimidazolyl)-o-Anisic Acid and Its Hydrochloride

In a similar manner, 70.0 grams (0.357 mole) of o-carboxyphenoxy acetic acid, 41.0 grams (0.336 mole) of 3,4-diaminotoluene, 170 milliliters of water and 70 milliliters of 37 percent hydrochloric acid were mixed together and heated at reflux temperature for 24 hours. The reaction mixture was then diluted with water to precipitate a crude α-(5-methyl-2-benzimidazolyl)-o-anisic acid hydrochloride salt as a greenish colored solid. The salt thus obtained was recovered by filtration, washed, dissolved by warming in dilute aqueous ammonia. The resulting mixture was extracted with diethyl ether to remove by-products and the aqueous ammonia solution acidified with hydrochloric acid and cooled to precipitate an α-(5-methyl-2-benzimidazolyl)-o-anisic acid hydrochloride salt. The salt having a moleclular weight of 313 was obtained in a yield of 77 percent.

The α-(5-methyl-2-benzimidazolyl)-o-anisic acid hydrochloride salt thus obtained was dissolved in aqueous ammonia with warming and carefully acidified to pH of 5.8 to obtain the desired α-(5-methyl-2-benzimidazolyl)-o-anisic acid product. The latter was recrystallized from aqueous ethanol to obtain a purified product as fine colorless needles melting at 179°–180° C. with decomposition.

EXAMPLE 4

α-(5-Chloro-2-Benzimidazolyl)-o-Anisic Acid and Its Hydrochloride

In a similar manner, 20.0 grams (0.0925 mole) of 4-chloro-1,2-phenylenediamine dihydrochloride, 20.0 grams (0.102 mole) of o-carboxyphenoxyacetic acid and aqueous hydrochloric acid were mixed together and heated at reflux temperature for 24 hours. The reaction mixture was then diluted with water to precipitate a α-(5-chloro-2-benzimidazolyl)-o-anisic acid hydrochloride salt which was recovered by filtration. The molecular weight of the salt is 334.5.

In a manner similar to that previously described, the hydrochloride was dissolved in aqueous ammonia with warming and carefully acidified to pH to 5.8 to obtain the desired α-(5-chloro-2-benzimidazolyl)-o-anisic acid product. The latter was recrystallized from ethanol-water to obtain a purified product melting at 215°–216° C. with decomposition.

EXAMPLE 5

In a similar manner, the following compounds are prepared:

α-(5-bromo-2-benzimidazolyl)-o-anisic acid having a molecular weight of 347 by the reaction of 4-bromo-1,2-phenylenediamine and o-carboxyphenoxyacetic acid in hydrochloric acid followed by reaction with aqueous ammonia.

α-(5-methyl-2-benzimidazolyl)-m-anisic acid having a molecular weight of 282 by the reaction of 4-methyl-1,2-phenylenediamine and m-carboxyphenoxyacetic acid in hydrochloric acid followed by reaction with aqueous ammonia.

α-(5-isopropyl-2-benzimidazolyl)-m-anisic acid having a molecular weight of 310 by the reaction of 4-isopropyl-1,2-phenylenediamine and m-carboxyphenoxyacetic acid in hydrochloric acid followed by reaction with aqueous ammonia.

α-(5-ethyl-2-benzimidazolyl)-p-anisic acid having a molecular weight of 296 by the reaction of 4-ethyl-1,2-phenylenediamine and p-carboxyphenoxyacetic acid in hydrochloric acid followed by reaction with aqueous ammonia.

α-(5-sec.-butyl-2-benzimidazolyl)-p-anisic acid having a molecular weight of 324 by the reaction of 4-sec.-butyl-1,2-phenylenediamine and p-carboxyphenoxyacetic acid in hydrochloric acid followed by reaction with aqueous ammonia.

α-(5-chloro-2-benzimidazolyl)-m-anisic acid having a molecular weight of 303 by the reaction of 4-chloro-1,2-phenylenediamine and m-carboxyphenoxyacetic acid in hydrochloric acid followed by reaction with aqueous ammonia.

EXAMPLE 6

α-(5-Methyl-2-Benzimidazolyl)-o-Anisamide 2 milliliters of thionyl chloride was added dropwise to a solution of 5 grams (0.018 mole) of α-(5-methyl-2-benzimidazolyl)-o-anisic acid prepared as described in Example 3 in 50 milliliters of anhydrous dimethylformamide and the resulting mixture allowed to stand for several hours. The reaction mixture was cooled and added slowly with stirring to 500 milliliters of concentrated ammonium hydroxide and thereafter warmed on the steam bath to drive off unreacted ammonia. Hot water was then added to the reaction mixture and the resulting mixture slowly cooled first to room temperature, then to about 5° C. and maintained at 5° C. overnight to obtain the desired α-(5-methyl-2-benzimidazolyl)-o-anisamide product as fine, colorless needles having a melting point of 84°–86° C.

EXAMPLE 7

In a similar manner, the following amides are prepared from the corresponding acids prepared in a manner similar to previously described:

α-(5-chloro-2-benzimidazolyl)-o-anisamide having a molecular weight of 302 by the reaction of α-(5-chloro-2-benzimidazolyl)-o-anisic acid with thionyl chloride to form the intermediate acid chloride followed by the reaction of the latter with ammonia.

α-(2-benzimidazolyl)-p-anisamide having a molecular weight of 267 by the reaction of α-(2-benzimidazolyl)-p-anisic acid with thionyl chloride to form the intermediate acid chloride followed by the reaction of the latter with ammonia.

α-(5-isopropyl-2-benzimidazolyl)-m-anisamide having a molecular weight of 309 by the reaction α-(5-isopropyl-2-benzimidazolyl)-m-anisic acid with thionyl chloride to form the intermediate acid chloride followed by the reaction of the latter with ammonia.

EXAMPLE 8

Ethyl α-(5-Methyl-2-Benzimidazolyl)-o-Anisate 2 milliliters of thionyl chloride was added dropwise to a solution of 5 grams (0.02 mole) of α-(5-methyl-2-benzimidazolyl)-o-anisic acid in 25 milliliters of dimethylformamide and the resulting mixture allowed to stand for several hours. At the end of this period 25 milliliters of anhydrous ethyl alcohol was added and the reaction mixture allowed to stand at room temperature for several hours, then warmed on a steam bath for about 15 minutes, cooled, diluted with water and extracted with diethyl ether. The ether was removed by vaporization to obtain a solid residue, the residue purified by redissolving in ether and removing insoluble by-products and thereafter vaporizing the ether filtrate to recover the desired ethyl α-(5-methyl-2-benzimidazolyl)-o-anisate product as fine colorless crystals melting at 124°–126° C.

EXAMPLE 9

In a manner similar to that described in Example 8, the following esters are prepared:

n-Butyl α-(5-methyl-2-benzimidazolyl)-o-anisate having a molecular weight of 338 by the reaction of α-(5-methyl-2-benzimidazolyl)-o-anisic acid and thionyl chloride to form the intermediate acid chloride, followed by the reaction of the latter with n-butyl alcohol.

Isopropyl α-(2-benzimidazolyl)-p-anisate having a molecular weight of 310 by the reaction of α-(2-benzimidazolyl)-p-anisic acid and thionyl chloride to form the intermediate acid chloride, followed by the reaction of the latter with isopropyl alcohol.

Sec.-butyl α-(5-chloro-2-benzimidazolyl)-m-anisate having a molecular weight of 359 by the reaction of α-(5-chloro-2-benzimidazolyl)-m-anisic acid and thionyl chloride to form the intermediate acid chloride, followed by the reaction of the latter with sec.-butyl alcohol.

Methyl α-(5-n-butyl-2-benzimidazolyl)-o-anisate having a molecular weight of 338 by the reaction of α-(5-n-butyl-2-benzimidazolyl)-o-anisic acid and thionyl chloride to form the intermediate acid chloride, followed by the reaction of the latter with methyl alcohol.

EXAMPLE 10

The following mineral acid salts are prepared by reacting substantially equimolar proportions of the anisic acid compound prepared as previously described and the appropriate mineral acid by mixing together in aqueous medium and warming together on a steam bath, then vaporizing off the water to recover the desired salt as residue: α-(2-benzimidazolyl)-p-anisamide.HBr, M.W. 348; α-(5-methyl-2-benzimidazolyl)-o-anisamide.H$_2$SO$_4$, M.W. 379; α-(5-bromo-2-benzimidazolyl)-o-anisic acid. H$_3$PO$_4$, M.W. 445; α-(5-chloro-2-benzimidazolyl)-m-anisic acid.H$_2$SO$_4$, M.W. 401.

EXAMPLE 11

The alkali metal, ammonium and amine salts of the anisic acid compounds are prepared by mixing together the appropriate anisic acid compound and base in substantially equimolar proportions, generally, in aqueous solvent and thereafter evaporating to dryness: sodium α-(2-benzimidazolyl)-o-anisate, M.W. 291; potassium α-(2-benzimidazolyl)-p-anisate, M.W. 307; ammonium α-(5-chloro-2-benzimidazolyl)-o-anisate, M.W. 320; α-(5-methyl-2-benzimidazolyl)-o-anisic acid, diethanolamine salt, M.W. 387; α-(2-benzimidazolyl)-o-anisic acid, ethanolamine salt, M.W. 329; α-(2-benzimidazolyl)-o-anisic acid, isopropanolamine salt, M.W. 343.

The products of the present invention show very interesting pharmacological properties rendering them useful tools for laboratory studies in exploring the mechanism of drug action. These compounds are useful in studies of hypotensive crisis occurring in dogs as a result of intravenous administration of certain high molecular weight polymeric carbohydrates such as those having allergenic properties. Thus, the compounds are effective in very minor amounts in reversing the hypotensive crisis above described. The anisic acid compounds, particularly, as salts at the carboxylic acid group are exceptionally well-adapted as pharmacological tools because of their water solubility. In such operation, administration of sodium α-(2-benzimidazolyl)-o-anisic acid to dogs after hypotensive crisis resulting from intravenous administration of high molecular weight carbohydrate produced effective reversal.

The products of the present invention are also useful as antimicrobial agents for the control of various antimicrobial species as *P. pullulans*, *S. typhosa*, *S. aureus* and *B. subtilis*. They are especially useful as fungicides and are adapted to be employed in such applications as control of mildew in exterior paint films. In a represenative operation, α-(2-benzimidazolyl)-o-anisic acid, α-(5-methyl-2-benzimidazolyl)-o-anisic acid and α-(5-chloro-2-benzimidazolyl)-o-anisic acid were separately dispersed in yeast agar media to give a concentration of 0.05 percent by weight and the resulting media separately inoculated with *P. pullulans* and incubated at 30° C. for 3 days. At the end of this period, complete inhibition of growth of the organism was observed in each case.

The reactant phenoxyalkanoic acids may be prepared by heating together the appropriate hydroxybenzoic acid and bromoacetic acid in the presence of aqueous sodium hydroxide, cooling and neutralizing the mixture to pH 6 to precipitate the desired phenoxyalkanoic acid reactant.

The reactant o-phenylenediamines may be prepared by various methods reported in the literature. They conveniently may be prepared from the corresponding chloro or nitro compound wherein the chloro group is aminated by heating at autogeneous pressure with ammonia and the nitro group is reduced by heating in a bomb at about 30° C. with hydrogen in the presence of Raney nickel catalyst at pressures of about 500 pounds per square inch.

We claim:
1. An anisic acid compound selected from the group consisting of (a) compounds having the formula

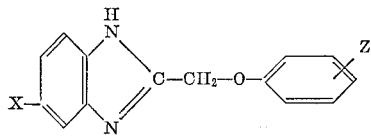

wherein X is selected from the group consisting of —H, —Cl, —Br and —R; and Z is selected from the group consisting of —COOH, —COOM, —COONH$_4$, —COOB, —COOR and —CONH$_2$; wherein R is lower alkyl containing from 1 to 4 carbon atoms, inclusive, M is alkali metal and COOB represents an amine salt group where the salt forming base is selected from the group consisting of lower alkylamines and lower alkanolamines; and (b) mineral acid salts of (a).

2. α-(2-benzimidazolyl)-o-anisic acid.
3. α-(2-benzimidazolyl)-p-anisic acid.
4. α-(5-methyl-2-benzimidazolyl)-o-anisic acid.
5. α-(5-chloro-2-benzimidazolyl)-o-anisic acid.
6. Sodium α-(2-benzimidazolyl)-o-anisate.
7. Ethyl α-(5-methyl-2-benzimidazolyl)-o-anisate.
8. α-(5-methyl-2-benzimidazolyl)-o-anisamide.

References Cited in the file of this patent
FOREIGN PATENTS
243,766    Great Britain _____ July 29, 1926

OTHER REFERENCES
Siegart et al.: Jour. Amer. Chem. Soc., vol. 79, pp. 4391–94 (1957).
Burger: Medicinal Chemistry, 2nd ed., pp. 77–79, N.Y., Interscience, 1960.